United States Patent [19]

Yancey

[11] 4,242,842

[45] Jan. 6, 1981

[54] PRECISION POLISHING SUSPENSION AND METHOD FOR MAKING SAME

[75] Inventor: Paul J. Yancey, Matthews, N.C.

[73] Assignee: La Pierre Synthetique Baikowski, S.A., Annecy, France

[21] Appl. No.: 65,005

[22] Filed: Aug. 8, 1979

[51] Int. Cl.$^3$ .............................................. C08J 5/14
[52] U.S. Cl. ...................................... 51/298; 51/309; 106/3
[58] Field of Search ................. 51/309, 307, 308, 298, 51/306, 304, 305; 106/3

[56] References Cited

U.S. PATENT DOCUMENTS

| | | | |
|---|---|---|---|
| 3,817,727 | 6/1974 | Yancey | 51/298 |
| 4,038,048 | 7/1977 | Thrower | 51/298 |
| 4,089,943 | 5/1978 | Roberts | 51/298 |
| 4,110,083 | 8/1978 | Benedict | 51/298 |
| 4,138,228 | 2/1979 | Hartfelt | 51/298 |

*Primary Examiner*—Donald J. Arnold
*Attorney, Agent, or Firm*—Bell, Seltzer, Park & Gibson

[57] ABSTRACT

A permanent precision liquid polishing suspension, and a method for making same, comprising fine abrasive polishing powders held in a suspension medium comprising an aqueous glycerine based composition thickened by a carboxy polymethylene polymer.

17 Claims, No Drawings

PRECISION POLISHING SUSPENSION AND METHOD FOR MAKING SAME

FIELD OF THE INVENTION

This invention relates to permanent precision liquid polishing suspensions and methods for making same and more particularly, permanent suspensions of fine polishing particles in nondrying and non-toxic thickened glycerine based media.

BACKGROUND OF THE INVENTION

Polishing, as a form of lapping, generally involves an application with force of an abrasive substance against a surface of an object to be polished so as to obtain a relatively smooth finish. Contrasted with grinding which is the other form of lapping and which is primarily concerned with abrading away a substantial portion of a surface and prominent irregularities therein, polishing is concerned with removal of minute or even microscopic irregularities.

Polishing and grinding are both typically conducted utilizing lapping compositions comprised of relatively small inorganic grit particles that serve as an abrasive agent and a carrier medium for same in which the particles are contained. The size of the grit particles used basically determines the smoothness of the finish obtained with 10 microns being the usual division size between grinding and polishing operations. Precision polishing operations for such materials as optical components, plastics, metals, gemstones, semiconductor components, and the like typically involve the use of even finer abrasive grit particles and present particular problems previously unsolved.

Typically, previous lapping compositions for use in connection with precision polishing have involved suspensions of very fine abrasive grit particles (less than about 5 microns in size). However, it has been extremely difficult to maintain the abrasive particles in homogeneous suspension in the carrier medium, particularly considering the relatively small amount of abrasive particles present compared to the large amount of medium in such compositions.

This problem has been particularly noted with using water as a medium; which, while being a common medium due to its ready availability and cheapness, has produced a suspension in which the abrasive particles mixed therein rapidly settle out of suspension and thereafter cake at the bottom of the composition container. Also, water based suspensions have exhibited a relatively fast loss of moisture during use necessitating frequent additions of further fluid during polishing operations to maintain the desired properties of the polishing composition on the polishing lap. Oil has sometimes been used as a polishing suspension carrier medium but has not been particularly desirable due to attendant removal problems from the lap and the work piece and the tendency of oil to flash during polishing operations, as well as nonpermanency of suspension.

Recently, fine polishing compositions have been introduced which utilize di-hydroxy glycols (such as ethylene glycol) as the primary component or base of the carrier medium. In connection with the glycol base, which is a glycol/water mixture with there being more glycol than water by overall weight-percent, a small amount of carboxy polymethylene polymer of high molecular weight has been introduced into the carrier to act as a composition thickener and better keep the abrasive particles in suspension. It has been necessary in making such compositions to add a neutralizing agent to the acidic polymer in order to achieve proper thickening of the carrier.

Such glycol based compositions admittedly have been superior to the preceding water based compositions in terms of permanency of suspension and resistance to drying out but have nonetheless not fully met the preexisting deficiencies and have indeed exhibited further undesired properties. For example, glycols generally are toxic substances so that human contact in polishing operations utilizing glycol based polishing compositions have had to be carefully carried out and monitored in a controlled environment lest repeated contact lead to undesirable results. The toxic nature of glycols further has made the ultimate disposal of waste portions of glycol based compositions a complicated and necessarily expensive process.

Furthermore, although less prone to rapidly dry out than the water based compositions, the glycol based polishing compositions still dry out on the lap during normal polishing operations. This presents a problem particularly when extended precision polishing operations are involved, and undesired additions of liquid are required to complete the polishing operations. Also, glycol based polishing compositions have exhibited a tendency to react with and stain and disfigure certain polished surfaces when not flushed and washed off immediately. This property of partial activity appears to explain why glycol based suspensions have been often unusually difficult to remove from polished metal surfaces.

In addition to the above deficiencies of existing polishing compositions noted relating to the liquid suspension media, further short-comings have been recognized in connection with the polishing abrasive used. For example, it has been common to use an aluminum oxide or alumina powder abrasive of nominal 3 micron size or less in typical fine polishing operations. However, it has been observed that agglomerates are contained in such aluminas that substantially increase the effective particle size of the abrasive to much larger than desired. The result is that use of such an agglomerated alumina may yield a substantially scratched surface after polishing that then has had to be repolished using a still finer abrasive in order to obtain a relatively scratch-free surface.

SUMMARY OF THE INVENTION

The foregoing short-comings and deficiencies are met by the present invention which relates generally to an improved non-toxic, precision liquid polishing composition comprising relatively fine abrasive polishing powder permanently suspended in a glycerine based medium thickened by a carboxy polymethylene polymer, wherein the glycerine makes up at least 25 weight-percent of the composition. Although this is the general object of the present invention, it is another object of the invention to provide a glycerine based permanent precision polishing suspension that resists drying out during polishing operations.

Another object of the invention is to provide a glycerine based permanent precision polishing suspension that is substantially inactive with the material being polished.

Another object of the invention is to provide novel methods of producing such suspensions.

Further and more specific objects and advantages of the invention will become apparent as the description proceeds.

DESCRIPTION OF PREFERRED EMBODIMENTS

The precision polishing composition of the present invention is essentially a suspension of a relatively fine (less than about 5 microns nominal size) abrasive polishing material in glycerine based media in which there is present less than one part polishing material to about five parts of media, so that the polishing material makes up less than about 20 weight-percent of the entire composition.

The polishing abrasive utilized may be one of a variety of grits including aluminum oxide, diamond, silicon carbide, silica, etc., having particles of the desired size, with aluminum oxide (alumina) being usually preferred because of its availability, suitability and relative cheapness, and typically being supplied in calcined form. In the case of conventional calcined aluminas, however, when provided in the nominal sizes of particles that are required for precision polishing, agglomerates are present therein formed by the individual particles joining together. This serves to substantially increase the effective particle size of the abrasive polishing material to beyond that desired, typically to about 15 to 30 microns in size. Polishing operations using such conventional alumina thereby frequently result in an unintended scratched finish that requires an additional final "finishing" polishing with a finer nominal sized alumina in order to obtain the desired finish. Preferable to such material, and the additional polishing frequently necessitated thereby, is the use of calcined alumina in de-agglomerated form; such is commercially available with one form being sold under the trademark "Baikalox." As supplied, de-agglomerated calcined alumina of a particular nominal particle size is comprised of alumina particles and some agglomerates thereof, but wherein the agglomerates are substantially limited to a size of about 4 microns or less. Thus such de-agglomerated alumina is inherently finer in actual particle sizes. Furthermore, the remaining agglomerates of the 4 micron size or less are loosely held together such that during the action of the polishing operation they tend to further reduce in size. The result of use thereof is a substantially scratch-free surface which is accomplished without the necessity of the additional "finishing" polishing step. Indeed use of this de-agglomerated alumina in connection with the novel suspension media of the invention results in an unexpected cooperation therewith to yield superior results.

The glycerine based medium of the invention is substantially comprised of glycerine and water there being at least about 25 weight-percent glycerine of the entire composition in order to attain the desired suspension and antidrying characteristics thereof. However, notwithstanding that desired medium fluidity may be achieved by even higher glycerine concentrations, even to the point of essentially all glycerine and no water, such are not usually desired, since it has been found that under most conditions sufficient glycerine will be present even if supplied in a lesser weight-percentage than water. Such is desirable considering the higher cost of glycerine compared to water. This is to be contrasted to comparable glycol based polishing suspensions which require more glycol than water (weight-percentage wise) in the final suspension.

The glycerine base makes for desirable suspension media particularly in the case of precision polishing. A glycerine based suspension is superior to both glycol based and water based suspensions in retaining liquid during polishing operations due to the lower vapor pressure of the glycerine and its high hygroscopicity. Furthermore, unlike most glycol based suspensions and especially those utilizing the common glycol, ethylene glycol, glycerine yields a non-toxic base. This is significant considering the extended intimate human contact frequently required in precision polishing operations and considering the problems and expenses attendant to disposing of waste polishing composition that is toxic.

Furthermore, since glycerine has a significantly lower vapor pressure than most glycols, as well as higher effective hygroscopicity in use, the glycerine based suspension of the invention stays liquid and functional much longer in the frictional heat generating polishing operation, even when utilized in lesser respective proportions than glycol. Glycerine also has a desirable superior lubricity comparable to oil, while being readily soluble in water for ready clean-up and removal. Glycerine furthermore is substantially inert compared to glycol so that it may be kept on polishing surfaces for extended periods without adverse effects, while also being moderately viscous so as to adhere well to the lap surface.

In addition to the invention's primary suspension media components of glycerine and water, there is also desired to be furnished a small amount of a thickening agent to insure suspension permanency and uniformity. Only a small quantity of thickener is needed due to the viscous nature of glycerine which aids in maintaining the abrasive particles in suspension.

This thickening agent may be a carboxy polymethylene polymer of high molecular weight such as the type sold by B. F. Goodrich Chemical Co. under the trade name Carbopol 941. Carbopol 941, as described in Service Bulleting GC-36 (Revised) of the B. F. Goodrich Chemical Company, is a commercially available water-soluble carboxy vinyl polymer resin having the following properties:

Physical properties

Appearance: Fluffy, white acid powder
Bulk density: 13 pounds per cubic foot (approximate)
Specific gravity: 1.41
Moisture content as shipped: 2% maximum
Equilibrium moisture content, room temperature, at 50% relative humidity: 8%
pH of 1% water solution: 3

The Carbopol 941 is supplied as a dry fluffy powder which should be carefully dispersed into the media liquids for proper mixing. Furthermore, neutralizing the acid form of the polymer with an inorganic or organic neutralizing agent or base produces optimum thickening quickly with a minimum amount of Carbopol. However, suitable gels can also be formed in connection with the glycerine based medium by using larger amounts of the polymer unneutralized. Such does require longer and slower mixing for proper thickening.

Neutralization is accomplished with a base such as sodium hydroxide, ammonium hydroxide or other inorganic base, or alternatively one of the organic bases such as diisopropanolamine, triethanolamine, or the like. The base so added to the mixture of the glycerine medium and Carbopol causes neutralization to take place thickening the solution.

The abrasive powder to be suspended is dispersed in either water, water/glycerine, or glycerine, which is then added to a gel separately formed and thoroughly blended thereinto to form the permanent suspension.

The suspension formed thereby consists essentially desirably of a de-agglomerated alumina polishing powder suspended in a medium containing glycerine thickened by neutralized or unneutralized carboxy polymethylene polymer. The pH of neutralized suspensions formed in this manner is between 7 and 8, and higher if excess base has been added. The pH of unneutralized suspensions ranges from 4-5 depending on the type of abrasive used in the formulation. Depending on the nature of the polishing operation to be performed and the material to be polished, a suspension of desirable pH may be obtained, by further adjustment if necessary.

It has been found that use of the de-agglomerated alumina in connection with the hygroscopic compound glycerine results in a polishing composition that lasts exceptionally long on the polishing lap as well as one that yields a remarkably smooth, scratch-free finish.

Having described the invention thusly, the following examples are provided to illustrate some of the various forms the invention may take and the methods for achieving the permanent suspensions of the invention.

EXAMPLE 1

Using a high shear bladed Waring type blender 105 grams of de-agglomerated alumina (1 micron nominal particle size) were blended into 300 cc. of distilled water and set aside. In another blender, 1.5 grams of Carbopol 941 were dispersed under high shear agitation into a mixture of 200 cc. glycerine and 100 cc. water. This blend was then neutralized by the addition of 15 cc. of a 12% volume aqueous triethanolamine solution to form a thick gel or mucilage. The powder/water slurry formed above was then immediately added and blended to the gel to form a very smooth suspension of the alumina in the liquid. The pH of the final suspension was 7.0-7.2.

EXAMPLE 2

Identical procedure to Example 1, except that 105 grams of a de-agglomerated 3 micron nominal particle size alumina were used. Final pH was 6.4-6.8.

EXAMPLE 3

Using a high shear Waring type blender 105 grams of de-agglomerated alumina (nominal particle size 0.3 micron) were blended into 300 cc. of distilled water. In another container, 2.0 grams of Carbopol 941 were dispersed in 100 cc. water and 200 cc. glycerine using a high shear blender and then this mixture was neutralized with 20 cc. of 12% volume triethanolamine aqueous solution to form a thick gel. The powder/water mix was then immediately blended into the gel to form a smooth permanent suspension. The use of a greater amount of Carbopol resin provided a more viscous suspension than those previously described. The pH of this suspension was 7.2-7.6.

EXAMPLE 4

In this example the use of a premixed gel is described. The example also describes the use of a low shear propeller type mixer for use with the Carbopol.

Using a two inch, three blade propeller mixer turning at 1200 rpm 2.25 grams of Carbopol 941 were dispersed into 900 cc. of distilled water. The mixture was allowed to stand for approximately one hour to allow the Carbopol resin to become wet and dissolve. The mixing was started again after the soak period, whereupon 27 cc. of 12% volume triethanolamine aqueous solution were added to the mix to form a clear, thick gel by the neutralization of the resin. The mixture was dispensed into a storage container for future use.

Using a high shear blender, 118 grams of alumina (nominal particle size 3 microns) were dispersed in a mixture of 100 cc. water and 200 cc. glycerine. This mixture was then blended into 300 cc. of the premix gel described above using the low shear propeller mixer turning at 1200 rpm. The resulting suspension had excellent consistency and fluid properties. Following this method of preparation employing the use of a low shear mixer in preparing the Carbopol gel and again in blending the gel and powder slurry, the suspension produced was thicker than the previusly described suspensions and used about one third as much Carbopol per volume. This phenomenon was evidently due to the low shear nature of the mixing. The pH of this suspension was 7.2-7.6.

EXAMPLE 5

As in the last example a premix gel was made, however in this example the glycerine/water ratio was established prior to any of the mixing steps.

Using a two inch, three blade propeller turning at 1200 rpm, 5.0 grams of Carbopol 941 were dispersed into a 1000 cc. mixture of ⅜ glycerine and ⅝ water (volume ratios). The dispersion was allowed to soak for about an hour, whereupon the mixer was restarted and the mixture was neutralized with 60 cc. of 12% volume triethanolamine aqueous solution forming a very thick, clear gel.

In a high shear blender, 118 grams of alumina (nominal particle size 3 microns) were dispersed into a ⅓ glycerine, ⅔ water solution (volume ratios). This slurry was then added to 300 cc. of the premixed gel above and mixed by hand followed by a short homogenizing step using the blender. A very smooth thick suspension resulted which had a pH of 7.0-7.2

EXAMPLE 6

This example is given to show that a permanent suspension of abrasive can be made with unneutralized Carbopol systems if desired.

Using a high shear blender 2 grams of Carbopol 941 were dispersed into 400 cc. of a 50% volume aqueous glycerine solution. The dispersion was then transferred to another container and stirred continuously for two hours using a two inch diameter propeller type mixer at about 300 rpm. The Carbopol resin thickened by action of hydrogen bonding in association with the glycerine. At the end of two hours, the thickened solution was transferred back to the high shear mixer, whereupon 70 grams of de-agglomerated alumina (1 micron nominal particle size) was dispersed into this thickened mixture by blending several minutes at slow blending speed (about 4,500 to 6,000 rpm in loaded condition). A very thick suspension was formed. Final pH of this suspension was 4.5-5.

Although a higher ratio of glycerine to water was utilized in this particular example as compared to the other preparations, smaller proportions of glycerine may be utilized in connection with unneutralized compositions and satisfactory results still obtained. For example, even where the glycerine weight-percentage is as low as about 30% of the entire composition using the same amounts of the other components, a satisfactory unneutralized composition will be obtained.

EXAMPLE 7

This example will serve to show the use of a premix gel as well as the use of another amine, diisopropanolamine, as a neutralizing agent.

A ⅓ glycerine, ⅔ water premix solution (volume ratios) was mixed as a base for making suspensions. A 1000 cc. portion was taken and to this was mixed 5.0 grams of Carbopol 941 using a propeller type stirrer. The mixture was allowed to stand for one hour whereupon mixing was restarted to thoroughly blend the moistened Carbopol. While stirring, the solution was then neutralized by adding 60 cc. of a 10% volume aqueous solution of diisopropanolamine to the Carbopol/water/glycerine solution. A very thick gel formed immediately.

A suspension was made by blending 118 grams of de-agglomerated alumina (0.3 micron nominal particle size) into 300 cc. of the above glycerine/water premix solution, and then blending this into 300 cc. of the premix gel described above. The mixture was at first mixed by hand and then briefly blended in a high shear blender to a homogeneous creamy consistency. The pH of this suspension was 7.6 to 8.0. There appeared to be no difference in suspension properties between this suspension and one formulated with triethanolamine as the neutralizing agent.

EXAMPLE 8

This example will illustrate another method of making a polishing suspension according to the invention which is especially desirable when relatively high concentrations of the Carbopol resin are utilized. Such high concentrations may be encountered in the make-up process where, as noted in the previous examples, a gel is initially prepared utilizing only about one-half or some partial amount of the final volume or when relatively high concentrations of Carbopol are used to counteract the effects of high ionic concentrations formed in certain abrasive materials.

Pursuant to this example, three grams of Carbopol 941 were dispersed into a mixture of 200 cc. glycerine and 400 cc. water using a propeller type mixer. To this dispersion was added 75 grams of 0.06 micron nominal particle size alumina to form a rather thick, creamy mixture. This mixture was transferred to a high shear type blender whereupon 36 cc. of a 10% aqueous solution of diisopropanolamine was added while blending, thus neutralizing the Carbopol as the last step of the operation. A very smooth suspension was formed.

As is the case when very small (less than 0.10 micron nominal size) particle size alumina is utilized in making up polishing compositions, such particles are very difficult to properly disperse in liquids and also typically contain relatively large amounts of sulfate ion impurities which are deleterious to Carbopol formulations unless a relatively high concentration of Carbopol is utilized. The technique of this example is useful for preparing such problem compositions as it accomplishes thickening at the last and most dilute stage of the formulation.

The weight-percentages of the constituents of the above suspension examples are set out in the following Table.

TABLE I

| Example No. | CONSTITUENT WEIGHT-PERCENTAGE | | | | |
| --- | --- | --- | --- | --- | --- |
| | Alumina | Water | Glycerine | Carbopol | Amine |
| 1 and 2 | 13.6 | 53.4 | 32.5 | 0.19 | 0.19 |
| 3 | 13.5 | 53.5 | 32.3 | 0.25 | 0.25 |
| 4 | 15.1 | 52.4 | 32.3 | 0.10 | 0.12 |
| 5 | 14.9 | 52.8 | 31.9 | 0.19 | 0.23 |
| 6 | 13.3 | 38.2 | 48.1 | 0.38 | 0.0 |
| 7 | 14.9 | 52.8 | 31.9 | 0.19 | 0.23 |
| 8 | 9.8 | 56.5 | 32.7 | 0.39 | 0.47 |

As indicated by the above description and table, the examples of the polishing composition of the invention consist of from about 9.8% to about 15.1% alumina powder having a nominal particle size of less than about 3 microns; from about 38.2% to about 56.5% water; from about 30% to about 48.1% glycerine; from about 0.10% to about 0.39% carboxy polymethylene polymer; and from about 0% to about 0.47% organic amine base (percentages expressed in weight-percentages of entire composition). Considering those examples utilizing a base to neutralize the Carbopol, the above ranges are reduced to from about 9.8% to about 15.1% alumina; from about 52.4% to about 56.5% water; from about 31.9% to about 32.7% glycerine; from about 0.10% to about 0.39% carboxy polymethylene polymer; and from about 0.12% to about 0.47% organic amine base (composition weight-percentages again).

In the above examples in which the Carbopol was neutralized there was utilized only a slight excess of neutralizing agent leaving the suspensions in a neutral or very slightly alkaline state. The organic neutralizing agents are usually preferred over the stronger inorganic bases since the organic agents do not introduce ion concentrations in the suspensions which can be deleterious in electronic and semiconductor substrate polishing.

The following additional examples are concerned with use applications and the performance of polishing compositions of the invention as compared with conventional compositions.

EXAMPLE 9

A Buehler Minimet type of single sample polishing machine was used for sample polishing. The samples polished were small 1" diameter cylinders of mild steel polished on one end with the composition being tested. The samples were polished for identical periods of time at identical pressures and on identical polishing pads and then compared under 20× and 40× magnification using oblique reflected illumination.

Here two polishing samples were prepared by first producing a relatively coarse 6 micron finish on them using diamond paste. The samples were then each polished on separate identical prewet polishing pads using on one sample a polishing composition comprised of a conventional calcined alumina of 0.3 micron nominal particle size suspended in a medium consisting essentially of ethylene glycol and water with more glycol than water by weight-percent and thickened with neutralized Carbopol; and using on the other sample the composition of this invention as provided in the above Example 3 with 0.3 micron nominal particle size de-agglomerated calcined alumina.

Both samples were polished with the respective compositions for 4 minutes and then removed, washed and observed under the microscope. The finish on the sample polished with the composition of the invention was of high quality with only one scratch over the background polish, whereas the other sample had many scratches covering the entire surface. This scratched sample was then repolished for 55 seconds on the pad containing the composition of the invention, whereupon it attained the same high quality finish of the other sample.

Five minutes after the polishing tests the polishing pads were compared. The pad with the conventional composition had started to dry and the composition had become "cakey" and hard to remove from the pad; whereas the pad with the composition of the invention was still very moist and the composition washed off easily from the pad.

EXAMPLE 10

Here a test was made to determine the relative staining properties of the composition invention in comparison to a conventional glycol/water based alumina polishing suspension. In particular, a 2 cc. sample of the composition of the invention as prepared in Example 7 above was applied to the surface of a polished aluminum plate. A corresponding amount of the composition utilizing ethylene glycol in place of glycerine was also applied to the plate surface.

The samples were left on the aluminum for 19 hours and then washed off in hot water and the plate dried. The ethylene glycol based sample visibly stained the aluminum plate severely, while the sample of the invention produced only slightly apparent staining. Indeed it was found that even 30 seconds contact with ethylene glycol based polishing compositions was sufficient to stain polished metal surfaces to the point that repolishing is required to obtain a desired mirror-like finish; such brief contact with the composition of the invention produced no such staining.

For some applications it may be advantageous to have either a very high or low pH suspension. This can be accomplished with the Carbopol neutralized suspensions of the invention as long as pH is adjusted after the Carbopol gel has been neutralized and before the abrasive mixture has been finally blended to maintain the suspension.

In the above Examples 1–8 aluminas in various forms and sizes were used as the respective abrasive substances. While such are generally preferred due to their availability, other abrasive substances of proper size may be substituted therefor.

As noted earlier, suspensions of this invention are used in the precision polishing of such materials as optical components, plastics, metals, gemstones, semiconductors or generally wherever an extremely smooth and substantially scratch-free surface is desired. In the polishing of plastic and plastic opticals in particular, the suspensions of this invention utilizing de-agglomerated alumina are especially preferred, since plastic is a relatively soft material that can be easily scratched by even loosely held larger agglomerates.

What is claimed is:

1. A substantially non-toxic precision liquid polishing composition having nondrying characteristics consisting essentially of a fine abrasive polishing powder having a nominal particle size of less than about 5 microns essentially permanently suspended in a viscous liquid medium comprising water, glycerine and a carboxy polymethylene polymer thickening agent wherein the polishing powder makes up less than about 20 weight-percent of the entire composition and wherein the glycerine makes up at least about 25 weight-percent of the entire composition.

2. A polishing composition according to claim 1 wherein the polishing powder is a de-agglomerated alumina polishing powder having a nominal particle size of less than about 3 microns.

3. A polishing composition according to claim 1 wherein the water is provided at a higher weight-percentage of the entire composition than that of the glycerine.

4. A polishing composition according to claim 3 additionally comprising a neutralizing agent taken from the class consisting of inorganic hydroxides and organic amines.

5. A polishing composition according to claim 4 wherein said neutralizing agent is present in an amount to provide a final pH of the composition from about 7 to 8.

6. A substantially non-toxic essentially permanent precision liquid polishing composition suspension comprising from about 9.8 weight-percent to about 15.1 weight-percent de-agglomerated calcined alumina powder having a nominal particle size of less than about 5 microns, from about 38.2 weight-percent to about 56.5 weight-percent water, from about 30 weight-percent to about 48.1 weight-percent glycerine, from about 0.10 weight-percent to about 0.39 weight-percent carboxy polymethylene polymer and from about 0 to about 0.47 weight-percent organic amine base.

7. A substantially non-toxic essentially permanent precision polishing composition suspension having nondrying characteristics consisting essentially of about 15 weight-percent de-agglomerated calcined alumina polishing powder having a nominal particle size of less than about 3 microns, about 53 weight-percent water, about 32 weight-percent glycerine, about 0.20 weight-percent carboxy polymethylene polymer and about 0.2 weight-percent of an organic amine base.

8. A polishing composition suspension according to claim 7 wherein said amine base is triethanolamine.

9. A substantially non-toxic essentially permanent precision polishing composition suspension consisting essentially of about 13 weight-percent de-agglomerated calcined alumina polishing powder having a nominal particle size of less than about 3 microns, from about 38 weight-percent to about 56 weight-percent water, from about 30 weight-percent to about 48 weight-percent glycerine and less than about 1 weight-percent carboxy polymethylene polymer.

10. A method of making a substantially non-toxic, essentially permanent precision polishing suspension comprising mixing a relatively small amount of a carboxy polymethylene polymer into water using a low shear propeller mixer, allowing such polymer mixture to stand to allow wetting of the polymer, adding a basic agent taken from the class consisting of inorganic hydroxides and organic amines to the polymer mixture and further mixing with a low shear propeller mixer to form a thickened mixture, separately blending a fine abrasive polishing powder having a nominal particle size of less than about 5 microns into a mixture of glycerine and water, and mixing said powder blend into said thickened mixture using a low shear propeller mixer.

11. A method of making a substantially non-toxic, essentially permanent precision polishing suspension comprising mixing a relatively small amount of a carboxy polymethylene polymer into a mixture of glycerine and water using a low shear propeller mixer, allowing such polymer mixture to stand to allow wetting of the polymer, adding a basic agent taken from the class consisting of inorganic hydroxides and organic amines to the polymer mixture and further mixing with a low shear propeller mixer to form a thickened mixture, separately blending a fine abrasive polishing powder having a nominal particle size of less than about 5 microns into a mixture of glycerine and water, and mixing said powder blend into said thickened mixture and thereafter briefly blending same to homogenize said suspension.

12. A method of making a polishing suspension according to claims 10 or 11 wherein the basic agent is an organic amine.

13. A method of making a substantially non-toxic, essentially permanent precision polishing suspension comprising mixing a relatively small amount of a carboxy polymethylene polymer into a mixture of glycerine and water and adding thereto a fine abrasive polishing powder having a nominal particle size of less than about 5 microns, and thereafter blending into such polymer mixture an organic amine neutralizing agent to thereby thicken and neutralize such mixture.

14. A method of making a polishing suspension according to claims 10, 11 or 13 wherein the total weight of glycerine introduced is less than the total weight of water introduced.

15. A method of making a substantially non-toxic essentially permanent precision polishing suspension comprising blending a relatively small amount of a carboxy polymethylene polymer into an aqueous glycerine solution, stirring in the absence of a neutralizing substance said polymer/aqueous glycerine mixture at a relatively slow speed of about 300 rmp using a low shear propeller mixer to form a thickened mixture, and blending a fine abrasive polishing powder having a nominal particle size of less than about 5 microns into said thickened mixture.

16. A method of making a polishing suspension according to claims 11, 12, 13 or 14 wherein the polishing powder is alumina.

17. A method of making a polishing suspension according to claims 11, 12, 13 or 14 wherein the polishing powder is de-agglomerated alumina.

* * * * *

UNITED STATES PATENT AND TRADEMARK OFFICE
CERTIFICATE OF CORRECTION

PATENT NO. : 4,242,842
DATED : January 6, 1981
INVENTOR(S) : Paul J. Yancey

It is certified that error appears in the above–identified patent and that said Letters Patent are hereby corrected as shown below:

Column 6, line 33, "5/8" should read --1/3--

Column 12, line 18, "rmp" should read --rpm--

Signed and Sealed this

Twenty-fourth Day of March 1981

[SEAL]

Attest:

RENE D. TEGTMEYER

Attesting Officer     Acting Commissioner of Patents and Trademarks